United States Patent [19]
Parker et al.

[11] 3,724,548
[45] Apr. 3, 1973

[54] WATERFLOODING METHOD USING MODIFIED STARCH GRANULES

[75] Inventors: Harry W. Parker, Lubbock, Tex.; John W. Marx, Bartlesville, Okla.

[73] Assignee: Phillips Petroleum Company, Bartlesville, Okla.

[22] Filed: Feb. 17, 1971

[21] Appl. No.: 116,216

[52] U.S. Cl. ................................................ 166/275
[51] Int. Cl. .................................................. E21b 43/25
[58] Field of Search ....... 166/275, 268, 246, 273, 274

[56] References Cited

UNITED STATES PATENTS

| | | | |
|---|---|---|---|
| 3,305,016 | 2/1967 | Lindblom | 166/246 |
| 3,336,977 | 8/1967 | Amott | 166/274 |
| 3,085,063 | 4/1963 | Turbak | 166/275 |

*Primary Examiner*—Robert L. Wolfe
*Attorney*—Young & Quigg

[57] ABSTRACT

Adding modified starch granules of a preselected size to the flood water for waterflooding a hydrocarbon containing formation and improving the flood front of said flood water.

7 Claims, No Drawings

WATERFLOODING METHOD USING MODIFIED STARCH GRANULES

This invention relates to a method of waterflooding a subterranean hydrocarbon containing formation. In another aspect, this invention improving to the use of modified starch granules for altering the injectivity profile of a flood water.

One different problem encountered in waterflooding a hydrocarbon containing formation is the establishment and maintenance of a uniform injectivity profile and flood front. A search is continually being made for plugging agents that have suitable mechanical strength, an ability to swell upon contact with water, are easy to handle, and are economical to use.

It is therefore an object of this invention to provide a method of waterflooding a hydrocarbon containing formation wherein a plugging agent is added to the flood water to produce a more uniform injectivity profile and flood front. Another object of this invention of the above-described type is to provide improved partial plugs within the formation by utilizing a starch particle plugging agent that has increased mechanical strength with no decrease in swelling properties relative to said starch particles before being treated to increase the mechanical strength. Other aspects, objects, and advantages of the present invention will become apparent from a study of the disclosure and the appended claims.

In the operation of this invention, a subterranean hydrocarbon containing formation is penetrated by at lease one injection well and at least one producing well. It should be understood, however, that this invention can be practiced where a plurality of producing and injection wells are utilized to flood and produce a common hydrocarbon containing formation. The relative placements of producing wells are remote from any injection well and can be in various patterns such as five spot, seven spot, nine spot, etc., as known in the art. A stream of flood water is injected downwardly through the injection well or wells and into the formation. A volume of starch granules are contained within at least a portion of the stream. The injected starch granules have a size in the range of about 5–32 microns and have been treated to have an increased mechanical strength with no decrease in swelling properties relative to said starch particles prior to treatment. The fluids entering the producing well or wells are produced to the surface and captured. The starch granules can be continuously injected into the flood water stream or added to the flood water stream at spaced apart locations to periodically slug the formation with plugging material. The flood water is preferably brine to reduce the rate of swelling of the particles during their transportation to the formation. Starch granules having the desired properties and granular size for controlling flooding of the pores of the formation are, for example:

| Material | Average granule size (diameter) |
|---|---|
| Rice starch | 5 microns |
| Cornstarch | 15 microns |
| Wheat starch | 20 microns |
| Potato starch | 32 microns |

The particular type starch granules or mixture thereof can be selected with reference to the size of the pore spaces desired to be plugged. It has been found that granules smaller or larger than the range of 5–32 microns are either too large or too small and are undesirable for selectively plugging portions of a flooded formation to control the flood front. It has also been found that German rice starch granules are preferred.

In order to prevent degradation of the starch material, bactericides can be added to the flood water stream. Bactericides that can be used with this invention are, for example:

Formaldehyde
Chloroform
Other commercially available bactericides.

For brine flood waters containing in excess of about 80,000 parts per million NaCl or substantial equivalent such as, for example, $MgCl_2$, $CaCl_2$, KCl, etc., there is substantially no biodegradation either in the atmosphere or under anaerobic reservoir conditions. In this flood water, a bactericide need not be added to the flood water starch mixture. For brines containing about 50,000–80,000 ppm salts, as set forth above, there is some biodegradation of the starch. This degradation is negligible in the atmosphere, but in some reservoirs, a bactericide may be preferred. However, for fresh water and brines having less than about 5000 ppm salts, as set forth above, it is preferred to mix 0.175 to 1.75 pounds of formaldehyde or chloroform per 42-gallon barrel of flood water.

The treatment method of modifying the starch granules to produce resultant granules having increased strength while not decreasing their swelling properties can be cross-linking said particles by treatment with epichlorohydrin, formaldehyde, organic dihalides, and other products as described, for example, in U.S. Pat. No. 2,500,950 and the *Encyclopedia of Chemical Technology*, Vol. 12, 1954, p. 776.

The following examples are some preferred treating methods of this invention for improving the configuration of the flood front.

EXAMPLE I

Injecting about 0.05–0.5 pore volume of a 250–5,000 ppm starch granule suspension per barrel of flood water over a 1- to 6-month period into a formation through a water injection well of a waterflood operation.

EXAMPLE II

Injecting a slug of about 200–500 barrels of flood water having suspended therein 500–10,000 ppm starch granules through a water injection well of a waterflood operation and into the formation adjacent thereto.

EXAMPLE III

Injecting a slug of about 200–5000 barrels of flood water having suspended therein 500–10,000 ppm starch granules through a producing well and into the formation adjacent thereto for restricting and reducing the influx of water from natural sources or from a waterflood. This slug of material can also be moved through the formation to desired positions spaced from the well bore as recommended by reservoir studies and the mechanical conditions of the downhole equipment and the formation.

German rice starch having a particle size of 25–30 microns can be treated with formaldehyde and cross-linked to increase the mechanical strength thereof by at least 10 percent. The granules can then be dispersed in sodium chloride brine and injected without filtration into the formation.

By injecting starch particles that have been treated for increasing the strength of said particles, selective plugging of the formation can be accomplished which is more durable and longer lasting against fluid dynamics within the formation, thereby making possible the forming and maintenance of a more uniform and desirable flood front. Without a controlled flood front, volumes of oil will be by-passed and left unrecovered in the formation.

Other modifications and alterations of this invention will become apparent to those skilled in the art from the foregoing discussion and it should be understOod that this invention is not to be unduly limited thereto.

What is claimed is:

1. A method for recovering hydrocarbons from subterranean hydrocarbon containing formations penetrated by at least one injection well and at least one remotely located producing well, comprising:
   injecting downwardly through the injection well and into the formation a stream of flood water having contained in at least a portion of said stream a volume of starch granules having a size in the range of about 5–32 microns with said granules being cross-linked to have an increased mechanical strength and substantially no decrease in swelling properties; and
   producing to the surface the fluid entering the producing well.

2. A method, as set forth in claim 1, wherein the starch granules are selected from at least one of a group of rice starch, cornstarch, wheat starch and potato starch.

3. A method, as set forth in claim 1, wherein the starch granules are intermittently added to the flood water stream at spaced apart locations.

4. A method, as set forth in claim 1, wherein the flood water is brine.

5. A method, as set forth in claim 1, wherein the bactericides are added to the flood water stream to prevent degradation of the starch material within the formation.

6. A method, as set forth in claim 1, wherein the flood water stream is injected into a plurality of injection wells and fluids are produced through a plurality of producing wells.

7. A method for recovering hydrocarbons from subterranean hydrocarbon-containing formatIons penetrated by at least one injection well and at least one remotely located producing well, comprising:
   injecting downwardly through the injection well and into the formation a stream of flood water haVing suspended in at least a portion of said stream a volume of starch granules having a size in the range of about 5–32 microns with said granules being crosslinked to have an increased mechanical strength and substantially no decrease in swelling properties, said granules being cross-linked with at least one of epichlorohydrin, formaldehyde, an organic dihalide, or an alkyl ester; and
   producing to the surface fluid entering the producing well.

* * * * *